(12) United States Patent
Ye et al.

(10) Patent No.: US 12,245,253 B2
(45) Date of Patent: Mar. 4, 2025

(54) SYSTEMS AND METHODS FOR RESOURCE ALLOCATION AND ENCODING OF INTER-UE COORDINATION MESSAGES

(71) Applicant: Apple Inc., Cupertino, CA (US)

(72) Inventors: Chunxuan Ye, Cupertino, CA (US); Chunhai Yao, Beijing (CN); Dawei Zhang, Cupertino, CA (US); Haijing Hu, Cupertino, CA (US); Haitong Sun, Cupertino, CA (US); Hong He, Cupertino, CA (US); Oghenekome Oteri, Cupertino, CA (US); Seyed Ali Akbar Fakoorian, Cupertino, CA (US); Sigen Ye, Cupertino, CA (US); Sudhir K Baghel, Cupertino, CA (US); Wei Zeng, Cupertino, CA (US); Weidong Yang, Cupertino, CA (US); Yushu Zhang, Beijing (CN); Zhibin Wu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,245

(22) PCT Filed: Oct. 16, 2020

(86) PCT No.: PCT/CN2020/121483
§ 371 (c)(1),
(2) Date: Oct. 14, 2021

(87) PCT Pub. No.: WO2022/077435
PCT Pub. Date: Apr. 21, 2022

(65) Prior Publication Data
US 2023/0247654 A1 Aug. 3, 2023

(51) Int. Cl.
*H04W 72/40* (2023.01)
*H04W 28/26* (2009.01)

(52) U.S. Cl.
CPC ........... *H04W 72/40* (2023.01); *H04W 28/26* (2013.01)

(58) Field of Classification Search
CPC ..... H04W 72/40; H04W 72/20; H04W 72/02; H04W 28/26; H04L 5/0053; H04L 5/0092
See application file for complete search history.

(56) References Cited

U.S. PATENT DOCUMENTS

| 2020/0170002 A1 | 5/2020 | Lee et al. | |
| 2021/0014831 A1* | 1/2021 | Ryu | ...................... H04W 72/02 |

(Continued)

FOREIGN PATENT DOCUMENTS

| CN | 110830952 A | 2/2020 |
| CN | 110859005 A | 3/2020 |

(Continued)

OTHER PUBLICATIONS

European Search Report and Search Opinion received for European Application No. 20957213.0, mailed on Apr. 22, 2024, 7 pages.

(Continued)

*Primary Examiner* — Rasheed Gidado
(74) *Attorney, Agent, or Firm* — Kubota & Basol LLP

(57) ABSTRACT

Disclosed are methods and systems to coordinate resource allocation between two UEs for sidelink communication. A receiving UE receiving sidelink communication from a transmitting UE may configure coordination resources used to coordinate sidelink communication between the two UEs. The receiving UE may receive from the transmitting UE data indicating resources reserved and intended to be used by the transmitting UE to transmit sidelink data to the receiving UE. The receiving UE may determine a coordination message used to indicate whether the resources reserved by the transmitting UE are available for use by the receiving UE to receive the sidelink data from the transmitting UE. The receiving UE may determine resources from the coordination resources to be used to carry the coordination message and may transmit the coordination message carried on the selected resources to indicate to the transmit- (Continued)

ting UE whether to use the reserved resources for the sidelink data.

18 Claims, 14 Drawing Sheets

(56) References Cited

U.S. PATENT DOCUMENTS

| | | | |
|---|---|---|---|
| 2021/0037468 A1* | 2/2021 | Huang | H04W 76/23 |
| 2021/0168814 A1 | 6/2021 | Chen et al. | |
| 2021/0176734 A1 | 6/2021 | You et al. | |
| 2021/0306824 A1* | 9/2021 | Li | H04W 4/40 |
| 2021/0314921 A1 | 10/2021 | Yang et al. | |
| 2022/0015103 A1* | 1/2022 | Peng | H04W 72/23 |
| 2022/0140955 A1* | 5/2022 | Liu | H04L 1/1671 |
| | | | 370/329 |
| 2022/0214420 A1* | 7/2022 | Assouline | H04L 5/0053 |
| 2022/0394560 A1* | 12/2022 | Yu | H04W 72/0446 |

FOREIGN PATENT DOCUMENTS

| | | |
|---|---|---|
| CN | 111294175 A | 6/2020 |
| CN | 111342941 A | 6/2020 |
| CN | 111526587 A | 8/2020 |
| WO | 2020/156163 A1 | 8/2020 |
| WO | 2020/173655 A1 | 9/2020 |

OTHER PUBLICATIONS

International Preliminary Report on Patentability received for PCT Patent Application No. PCT/CN2020/121483, mailed on Apr. 27, 2023, 5 pages.
International Search Report and Written Opinion received for PCT Patent Application No. PCT/CN2020/121483, mailed on Jul. 15, 2021, 6 pages.
Moderator (LG Electronics), "Summary for AI 8.11.2.2 Feasibility and benefits for mode 2 enhancements", #3GPP TSG RAN WG1 #102-e, e-Meeting, R1-2007412, Aug. 17-28, 2020, pp. 1-33.

* cited by examiner

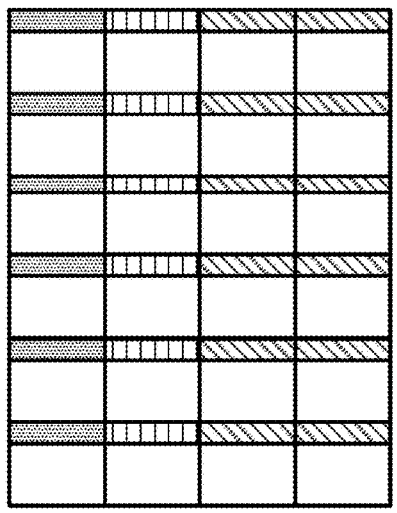
FIG. 7B
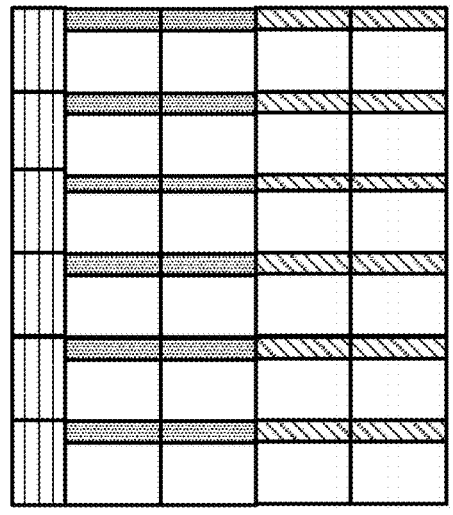
FIG. 7D
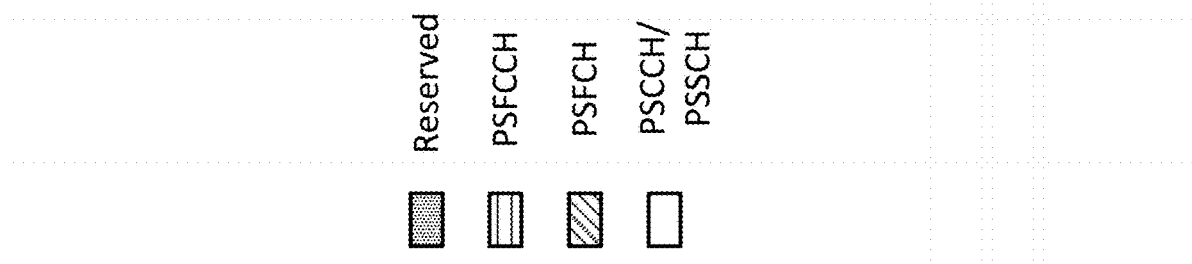
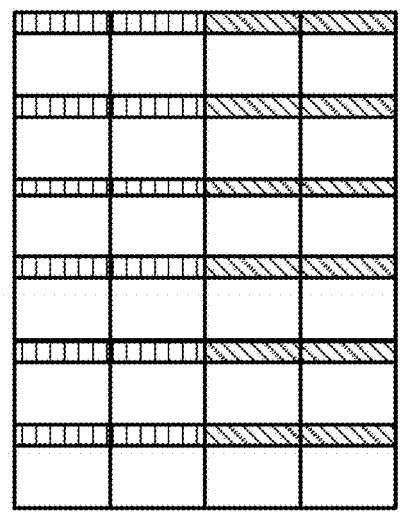
FIG. 7A
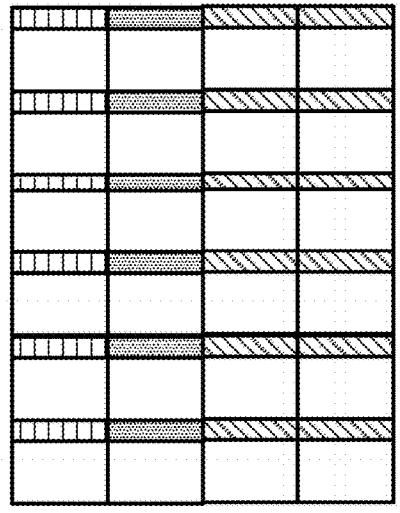
FIG. 7C

| (HARQ-ACK bit, Coordination bit) | (0,0) | (0,1) | (1,1) | (1,0) |
|---|---|---|---|---|
| Sequence cyclic shift ($m_{cs}$) | 0 | 3 | 6 | 9 |

FIG. 12A

Mapping of Sidelink HARQ-NACK/ACK bit (HARQ option2) and a coordination bit to a cyclic shift of a sequence for a PSFCH transmission

| (HARQ-ACK bit, Coordination bit) | (0,0) | (0,1) | (1, NA) |
|---|---|---|---|
| Sequence cyclic shift ($m_{cs}$) | 0 | 4 | 8 |

FIG. 12B

Mapping of Sidelink HARQ-NACK bit (HARQ option2) and a coordination bit to a cyclic shift of a sequence for a PSFCH transmission. If Sidelink HARQ is ACK, there is no need to indicate coordination bit

| (HARQ-ACK bit, Coordination bit 1, Coordination bit 2) | (0,0,0) | (0,0,1) | (0,1,0) | (0,1,1) | (1, NA, NA) |
|---|---|---|---|---|---|
| Sequence cyclic shift ($m_{cs}$) | 0 | 2 | 4 | 6 | 8 |

FIG. 12C

Mapping of Sidelink HARQ-NACK bit (HARQ option 2) and 2-bit coordination message to a cyclic shift of a sequence for a PSFCH transmission. If Sidelink HARQ is ACK, there is no need to indicate coordination bits

| (HARQ-ACK bit, Coordination bit) | (0,0) | (0,1) |
|---|---|---|
| Sequence cyclic shift ($m_{cs}$) | 0 | 6 |

FIG. 13

Mapping of Sidelink HARQ-NACK bit (option 1) and coordination bit to a cyclic shift of a sequence for a PSFCH transmission. Coordination bit is indicated only if HARQ is NACK

SYSTEMS AND METHODS FOR RESOURCE ALLOCATION AND ENCODING OF INTER-UE COORDINATION MESSAGES

RELATED APPLICATIONS

The present application is the national phase of International Application No. PCT/CN2020/121483, filed on Oct. 16, 2020 and the disclosure of which is hereby incorporated herein by reference in its entirety.

FIELD OF INVENTION

This invention relates generally to the field of wireless communication, and more particularly, to systems and methods for wireless communication devices to coordinate resource allocation and to encode messages for sidelink communication between the devices. Other aspects are also described.

BACKGROUND OF THE INVENTION

In wireless communications networks, a user equipment (UE) may communicate with another UE without having the communication routed through a base station of the networks using what is referred to as sidelink communication. A transmitting UE that wants to initiate sidelink communication may determine the available resources (e.g., sidelink resources) and may select a subset of these resources for use to communicate with a receiving UE based on a resource allocation scheme. Sidelink communication finds applications in increasingly more deployment scenarios including use by autonomous vehicles to communicate with other autonomous vehicles, pedestrians, or with the road infrastructure, etc. For example, 5G New Radio (NR) V2X (Vehicle-to-everything) supports sidelink communication using existing Mode 1 and Mode 2 resource allocation schemes.

In Mode 2 resource allocation scheme, the transmitting UE selects sidelink resources (e.g., sidelink transmission resources) to try to minimize collision probability and to reduce an interference level. In particular, in Mode 2 resource allocation scheme for NR V2X, the transmitting UE autonomously selects sidelink transmission resources based on its own channel sensing mechanism and resource selection procedures. The determination of the sidelink transmission resource may include resource pool pre-configuration, sensing, resource selection and re-selection, and sidelink transmission with resource reservation.

However, the Mode 2 resource allocation scheme lacks coordination between the transmitting and receiving UEs to identify if sidelink resources reserved or selected by the transmitting UE are available for use by the receiving UE. Thus, there is a need for an enhanced mechanism for UEs in sidelink communication to coordinate sidelink resource allocation to improve reliability and reduce communication latency, thereby enhancing the safe operation of autonomous vehicles using sidelink communication.

SUMMARY OF THE DESCRIPTION

Methods and systems to coordinate resource allocation between two user equipment (UE) for sidelink communication using coordination messages are disclosed. A receiving UE that receives resources reserved by a transmitting UE for sidelink communication may configure resources used to transmit a coordination message from the receiving UE back to the transmitting UE. The coordination message may inform the transmitting UE whether the reserved resources are unavailable for use by the receiving UE. The resources configured for the coordination message may include time, frequency, and code domain resources. In one aspect, the coordination message may use resources allocated for the receiving UE to provide feedback regarding the decoding status of data received from the transmitting UE such as the Hybrid Automatic Repeat Request (HARQ) feedback.

In one aspect, resources from a coordination feedback channel separate from the physical channel of the HARQ feedback may be used for the coordination message. The resources of the coordination feedback channel may be unused frequency resources of the physical channel reserved for the HARQ feedback. In one aspect, the resources of the coordination feedback channel may be unused frequency resources of a frequency pool not reserved for the HARQ feedback. Bitmaps may be used to indicate the allocation of resource configured for the separate coordination feedback channel and for the HARQ feedback channel. The physical channel carrying the reserved resources received from the transmitting UE may be mapped to the resources of the coordination feedback channel configured to carry the corresponding coordination message. Such resource mapping for the coordination message may be linked to the mapping from the physical channel carrying the reserved resources to the resources of the physical channel carrying the corresponding HARQ feedback.

The resources reserved by the transmitting UE may include reserved resources for one or more transmission slots. Reserved resources in a subsequent transmission slot may be used to retransmit sidelink data that fails to be received in an earlier transmission slot or to transmit new sidelink data. The coordination message may indicate whether the reserved resources are feasible or not feasible based on local sensing by the receiving UE. The reserved resource may be non-feasible if they collide with resources reserved by another transmitting UE with higher priority or by the receiving UE itself. In one aspect, a single bit of the coordination message may indicate non-feasibility if there is a collision on any of the reserved resources or if there is a collision on only the reserved resource for the next transmission slot. Otherwise, the single bit may indicate the reserved resources are feasible. In one aspect, the receiving UE may send the coordination message only when the reserved resources are non-feasible. In one aspect, there may be multiple bits in the coordination message, one bit for each of the reserved resources from the transmitting UE. In one aspect, additional bits may indicate the interference level corresponding to the reserved resources.

In one aspect, when the coordination message uses resources allocated for the receiving UE to provide HARQ feedback, the one or more bits of the coordination message may be jointly encoded with the HARQ feedback in the code domain to map the coordination message and the HARQ feedback to cyclic shifts of a sequence. The sequence may be mapped to the time and frequency resources of the physical channel carrying the HARQ feedback. In one aspect, the joint encoding may indicate the feasibility/non-feasibility state in the coordination message when the HARQ feedback is either an acknowledgement (ACK) signal or a non-acknowledgement (NACK) signal. In one aspect, the joint encoding may not encode the coordination message when the HARQ feedback is ACK. In one aspect, the joint encoding may not encode the HARQ feedback and the coordination message when the HARQ feedback is ACK.

In one aspect, when resources of the separate coordination feedback channel are used to transmit the coordination message, the coordination message may be separately encoded in the code domain to map the coordination message to cyclic shifts of a sequence. The sequence may be mapped to the configured time and frequency resources of the coordination feedback channel. In one aspect, a single bit indicating the feasibility/non-feasibility state in the coordination message may be encoded. In one aspect, a single bit indicating only the non-feasibility state in the coordination message may be encoded. In one aspect, multiple bits of the coordination message may be encoded.

In one aspect, a method for a receiving UE to allocate sidelink coordination resources and encode coordination message is disclosed. The receiving UE may configure a pool of coordination resources used to coordinate sidelink communication between the receiving UE and a transmitting UE. The receiving UE may receive from the transmitting UE data indicating resources reserved and intended to be used by the transmitting UE to transmit sidelink data to the receiving UE. The receiving UE may determine a coordination message used to indicate whether the resources reserved by the transmitting UE are available for use by the receiving UE to receive the sidelink data from the transmitting UE. The receiving UE may determine resources from the pool of coordination resources that are to be used to carry the coordination message. The receiving UE may transmit the coordination message carried on the selected resources to indicate to the transmitting UE whether to use the reserved resources for the sidelink data.

BRIEF DESCRIPTION OF THE DRAWINGS

The present invention is illustrated by way of example and not limitation in the figures of the accompanying drawings in which like references indicate similar elements.

FIG. 7A to FIG. 7D depict various divisions of frequency resources for Physical Sidelink Feedback Coordination Channel (PSFCCH) carrying coordination messages and for Physical Sidelink Feedback Channel (PSFCH) according to one aspect of the disclosure.

FIG. 12A to FIG. 12C depict various joint encoding of the HARQ NACK/ACK bit and one or more bits of the coordination message to map to cyclic shifts of a sequence for a PSFCH transmission according to one aspect of the disclosure.

FIG. 13 depicts a joint encoding of the HARQ NACK bit and one bit of the coordination message to map to cyclic shifts of a sequence for a PSFCH transmission according to one aspect of the disclosure.

DETAILED DESCRIPTION

Figure 1:
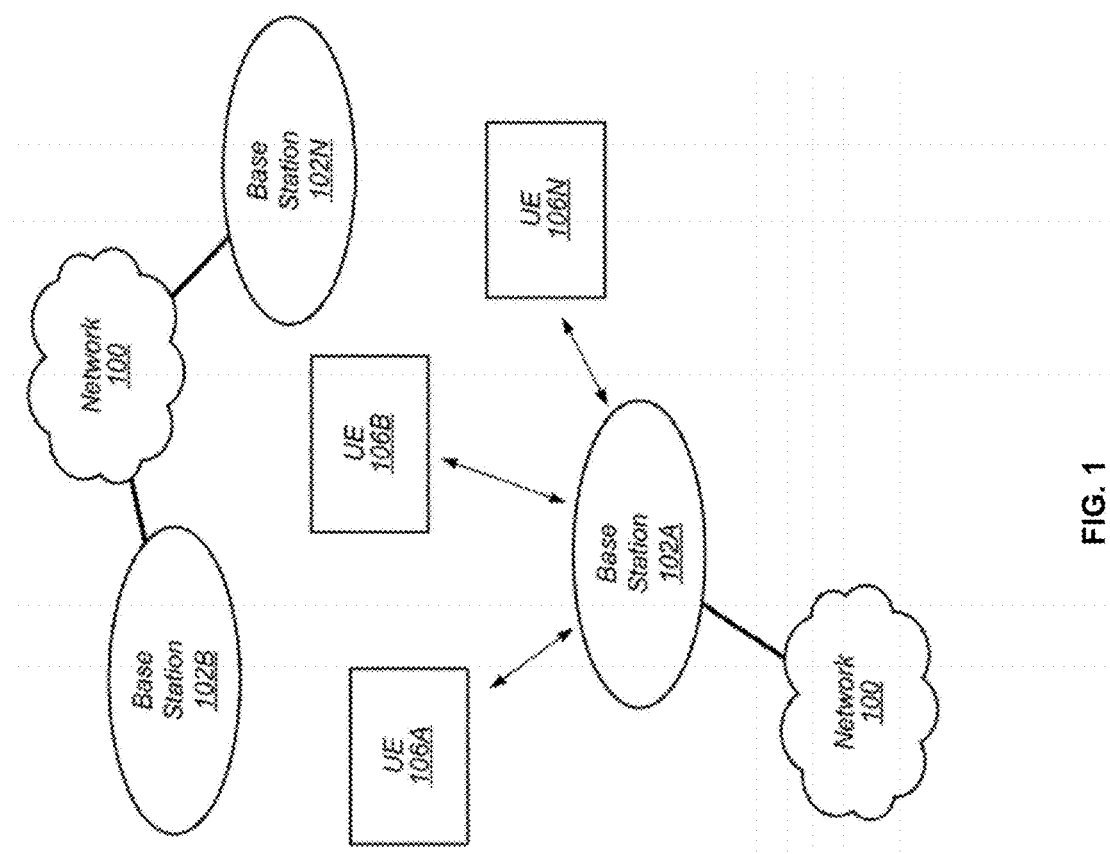
FIG. 1 illustrates an example wireless communication system according to one aspect of the disclosure.

Methods and systems to coordinate resource allocation between two UEs for sidelink communication using coordination messages are disclosed. A receiving UE that receives resources reserved by a transmitting UE for sidelink communication may configure resources used to transmit a coordination message from the receiving UE back to the transmitting UE. The coordination message may inform the transmitting UE whether the reserved resources are unavailable for use by the receiving UE due to collisions with resources reserved by another UE or due to half duplex restriction based on the receiving UE's own scheduling, or due to interference by other UEs.

In one aspect, the pool of coordination resources used to coordinate the sidelink communication may include resources from a Physical Sidelink Feedback Channel (PSFCH) that is used jointly for carrying Hybrid Automatic Repeat Request (HARQ) feedback of the sidelink communication and the coordination message. In one aspect, the pool of coordination resources used to coordinate the sidelink communication may include resources from a Physical Sidelink Feedback Coordination Channel (PSFCCH) separate from the PSFCH used for carrying the HARQ feedback of the sidelink communication.

In one aspect, the pool of coordination resources of the PSFCCH may include frequency resources that are not used by the PFSCH in symbols at the end of a slot. All or part of the unused PSFCH frequency resources may be used by the PSFCCH. In one aspect, to allocate resources between the PSFCCH and the PFSCH, the receiving UE may determine a joint bitmap whose bits indicate the frequency resources used by the PSFCH for the HARQ feedback and the frequency resources used by the PSFCCH to carry the coordination message. In one aspect, there may be separate bitmaps to indicate the frequency resources of the PSFCH and PSFCCH. The data received from the transmitting UE indicating the resources reserved by the transmitting UE to transmit the sidelink data may be received using resources of a Physical Sidelink Shared Channel (PSSCH).

In one aspect, the amount of frequency resources for the PSFCCH may be equal to the amount of frequency resources for the PSFCH. To determine resources from the pool of coordination resources used to carry the coordination message, there may be a one-to-one correspondence between mapping the HARQ feedback of the PSSCH carrying the reserved resources on the frequency resources of the PSFCH and mapping the coordination message corresponding to the PSSCH on the frequency resources of the PSFCCH.

In one aspect, the amount of frequency resources for the PSFCCH is not equal to the amount of frequency resources for the PSFCH. To determine resources from the pool of coordination resources used to carry the coordination message, there may be a set-to-set correspondence between mapping the HARQ feedback of the PSSCH carrying the reserved resources on the frequency resources of the PSFCH and mapping the coordination message corresponding to the PSSCH on the frequency resources of the PSFCCH. The set-to-set correspondence may be determined by a ratio of the amount of frequency resources for the PSFCH and the PSFCCH.

In one aspect, the receiving UE may determine that the resources reserved by the transmitting UE are unavailable for use by the receiving UE because of a collision with resources reserved by another transmitting UE and an estimated difference of the reference signal received power (RSRP) from the transmitting UE and from the other transmitting UE is below a threshold. The reserved resources may include reserved resources for multiple transmission slots. Reserved resources in a subsequent transmission slot may be used to retransmit sidelink data that fails to be received in an earlier transmission slot or to transmit new sidelink data. In one aspect, the receiving UE may determine that the resources reserved by the transmitting UE are unavailable for use by the receiving UE because of a collision with resources reserved by the UE for data transmission. In one aspect, the receiving UE may determine that the resources reserved by the transmitting UE are unavailable for use by the receiving UE because the receiving UE has sidelink or uplink transmissions scheduled on the same transmission slot and half duplex restriction prevents the simultaneous transmission and reception, while the receiving UE's sidelink or uplink transmissions are associated with a higher data priority.

In one aspect, the content of the coordination message may include a single bit that indicates whether the resources reserved by the transmitting UE are available or unavailable, also referred to as feasible or non-feasible. In one aspect, if there are multiple reserved resources, the feasibility or non-feasibility bit may depend on the feasibility or non-feasibility of any of the reserved resources, or only on the feasibility or non-feasibility of the nearest reserved resource. In one aspect, the receiving UE may send the single bit of the coordination message only when the reserved resources are non-feasible. In one aspect, the content of the coordination message may include multiple bits that correspond to the number of resources reserved by the transmitting UE. In one aspect, the coordination message may include additional bits to indicate an interference level if the reserved resources are unavailable due to interference.

In one aspect, when the resources of the PSFCH are jointly used for the HARQ feedback and the coordination message, the HARQ feedback and the coordination message may be jointly encoded in the code domain. The HARQ feedback may include an acknowledgement (ACK) signal or a non-acknowledgement (NACK) signal. In one aspect, the HARQ feedback jointly encoded with the coordination message may include only a NACK signal. The joint encoding may be mapped to cyclic shifts of a sequence for a PSFCH transmission.

In one aspect, when the resources of the PSFCCH are used for the coordination message separate from the resources of the PSFCH, the coordination message and the HARQ feedback may be separately encoded in the code domain. One or more bits of the coordination message may be mapped to cyclic shifts of a sequence for a PSFCCH transmission.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
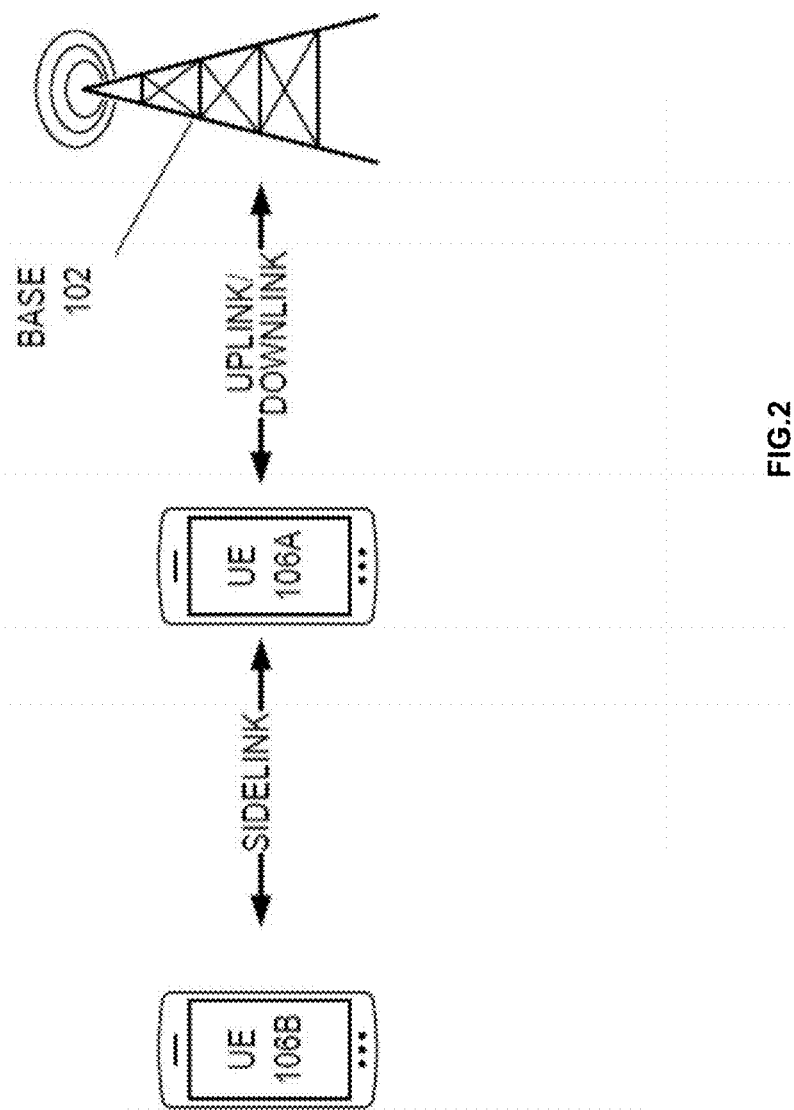
FIG. 2 illustrates user equipment 106A and 106B that can be in direct communication with each other (also known as device to device or sidelink) according to one aspect of the disclosure.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTTor LTE or GSM), and separate radios for communicating using each of Wi-Fi and Bluetooth. Other configurations are also possible.

Figure 3:
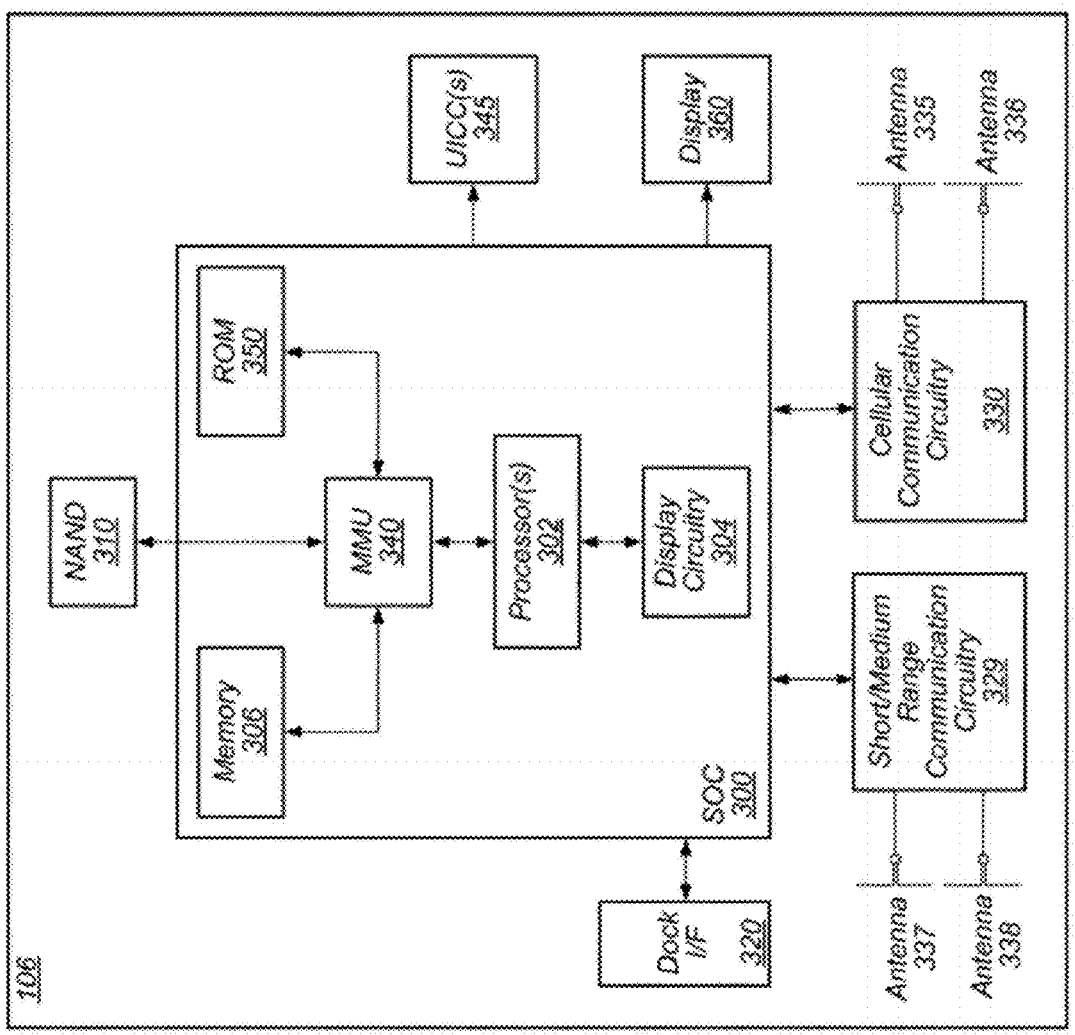
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
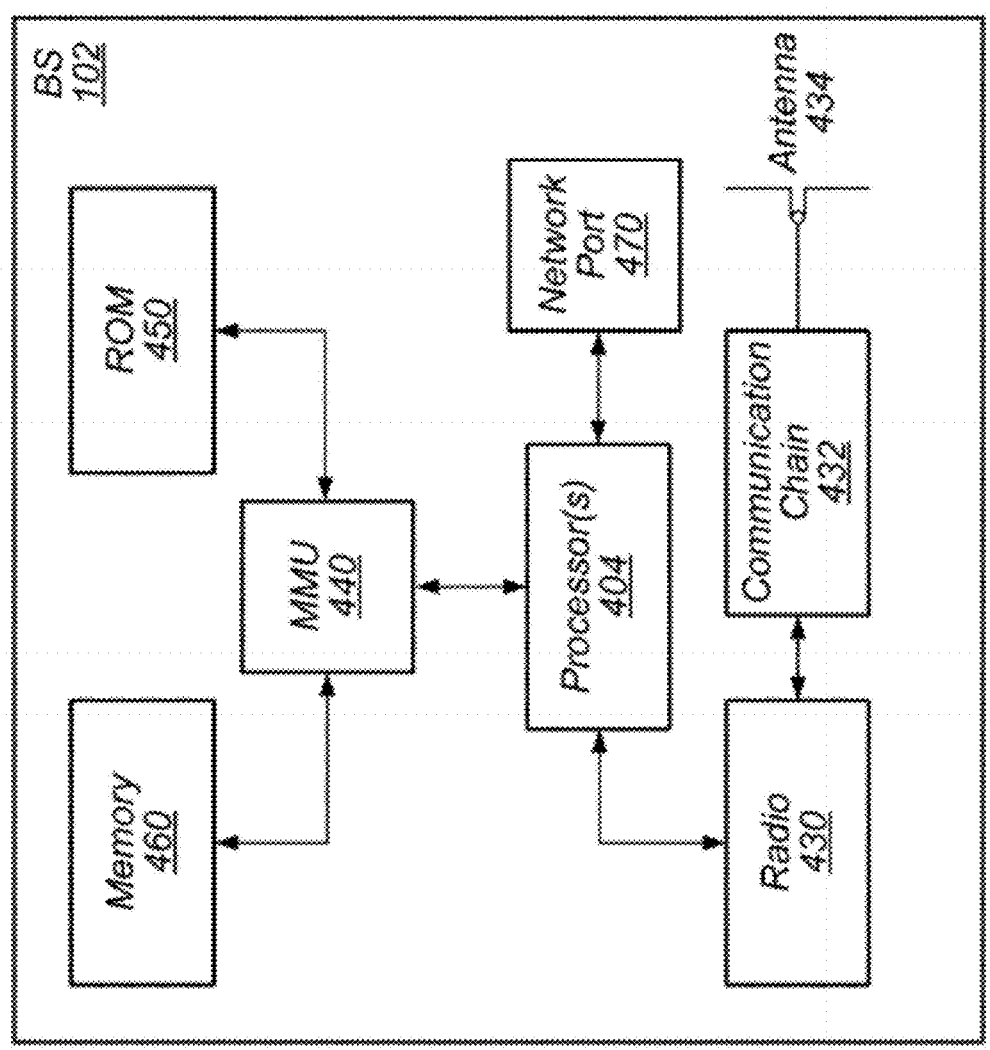
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UEs 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UEs 106. In some cases, the network port 470 may couple to a telephone network via the core network, and/or the core network may provide a telephone network (e.g., among other UEs serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UEs 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
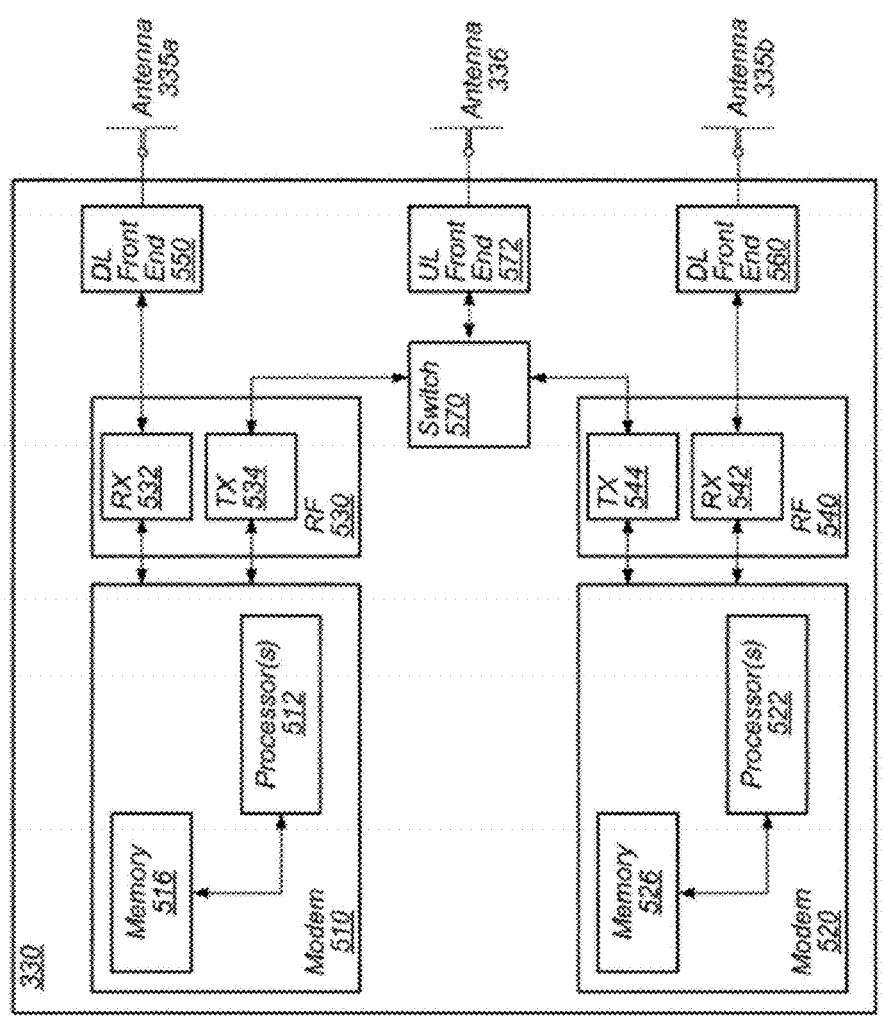
FIG. 5 illustrates an example block diagram of cellular communication circuitry according to one aspect of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
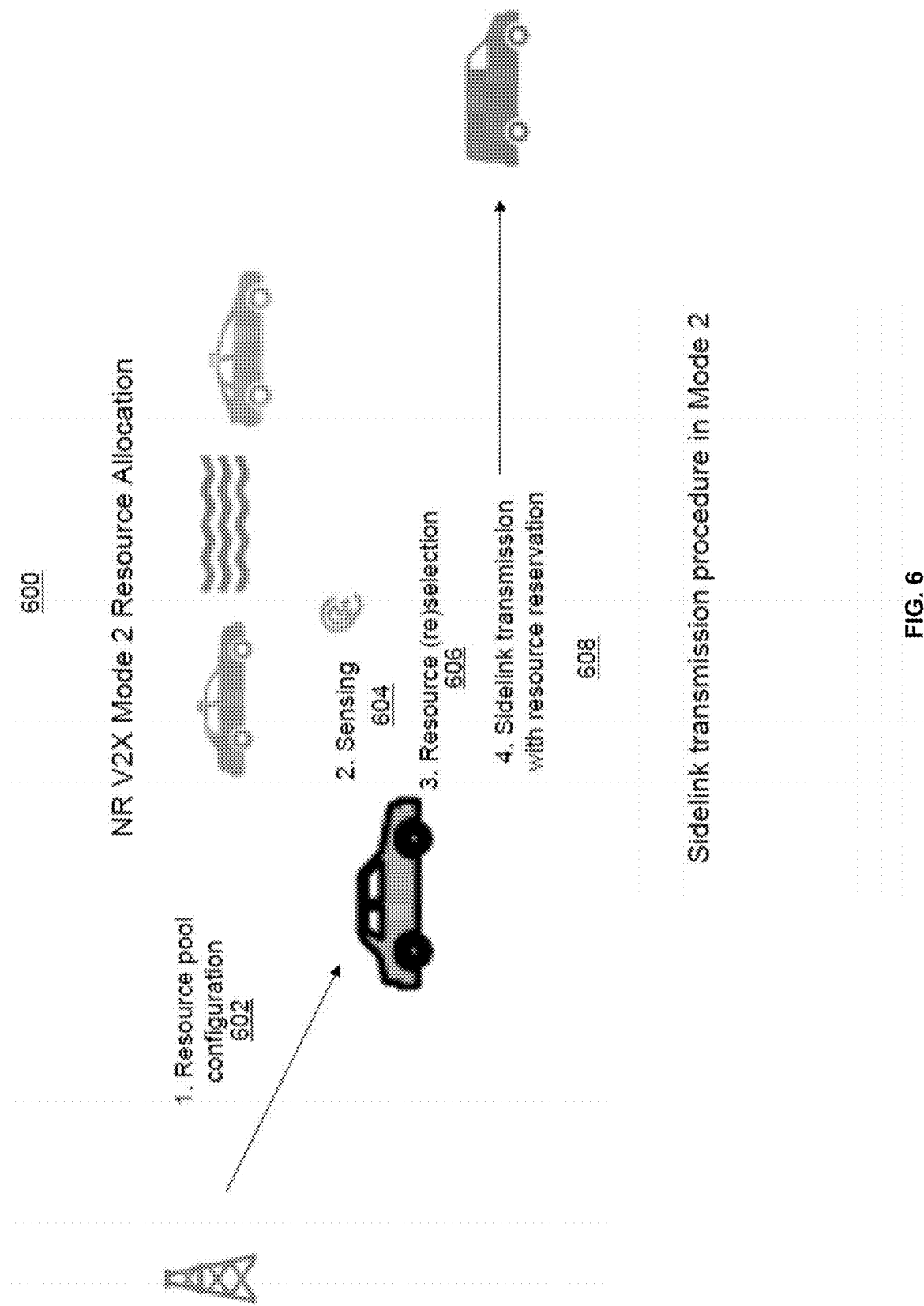
FIG. 6 depicts a resource allocation procedure for sidelink transmission in Mode 2 of NR V2X.

FIG. 6 depicts a resource allocation procedure 600 for sidelink transmission for NR V2X Mode 2. In NR V2X Mode 2, resource allocation procedure 600 can include a transmitting UE determining sidelink transmission resource within a set of sidelink resources that have been configured by a network. The determination of the sidelink transmission resource can include four operations including resource pool (pre-)configuration 602, sensing 604 (sidelink data ready for transmission), resource selection and re-selection 606, and sidelink transmission with resource reservation 608. NR V2X direct sidelink communication without using the cellular network can enhance autonomous driving in use cases including vehicles platooning, extended sensors, advanced driving, and remote driving. In vehicles platooning, NR V2X direct sidelink enables the vehicles to dynamically form a group travelling together. In extended sensor use cases, NR V2X direct sidelink enables the exchange of raw or processed data among vehicles, road side units, devices of pedestrians and V2X application servers. In advanced driving, NR V2X direct sidelink enables semi-automated or fully-automated driving. In remote driving, NR V2X direct sidelink enables a remote driver or a V2X application to operate a remote vehicle.

During the sensing operation 604 of the resource allocation procedure 600, the transmitting UE may coordinate with an intended receiving UE of the sidelink communication to determine if sidelink resources reserved or selected by the transmitting UE are available for use by the receiving UE. The transmitting UE may transmit to the receiving UE information on the resources reserved by the transmitting UE for the sidelink communication. The receiving UE may transmit a coordination message back to the transmitting UE to inform the transmitting UE whether the reserved resources are unavailable for use by the receiving UE due to collisions with resources reserved by another UE or due to half-duplex constraints at the receiving UE, or due to interference by other UEs.

The receiving UE may configure resources for transmission of the coordination message to the transmitting UE to coordinate inter-UE resource selection for the sidelink communication. In one aspect, the coordination message may be applicable only to sidelink unicast or groupcast, not to sidelink broadcast from the transmitting UE. For sidelink groupcast HARQ option 1, where the HARQ feedback is only for NACK (i.e., receiver UE does not feedback ACK if packets of the sidelink communication such as PSSCH is decoded correctly), the coordination message may not be applicable when the distance between the transmitting UE and the receiving UE is larger than a maximum communication range. The transmitting UE's resource re-selection may depend on the receiving UE's feedback coordination message. The coordination message is based on the receiving UE's local sensing results.

In one aspect, the receiving UE may transmit the coordination message using resources of the PSFCH that are used to feedback HARQ of the sidelink communication. The resources for the coordination message may be jointly configured with the pool of resources for the PSFCH. That is, if the resource pool for the PSFCH resources are configured, the resources for coordination messages are also configured. On the other hand, if the pool of resources for the PSFCH are not configured, the resources for coordination messages are also not configured.

In one aspect, the resources used to transmit the coordination message may include resources from the PSFCCH that is a separate physical channel from the PSFCH carrying the HARQ feedback. Thus, the pool of resources for the coordination messages may be configured separately from the pool of resources for the PSFCH.

FIG. 7A to FIG. 7D depict various divisions of frequency resources for PSFCCH carrying coordination messages and for PSFCH carrying HARQ feedback according to one aspect of the disclosure. In one aspect, the resources for the coordination message in the PSFCCH may be unused PSFCH resources. The last few symbols of a slot may be used to transmit the PSFCH. However, not all of the reserved PSFCH frequency resources are used for PSFCH transmissions. The unused PSFCH frequency resources may be used for transmitting coordination messages. In one aspect, all or part of the unused PSFCH frequency resources may be used for the PSFCCH.

FIG. 7A shows that all of the unused frequency resources of the PSFCH may be used for the PSFCCH. The frequency resources may be grouped into sub-channels. The sub-channels that are reserved for the PSFCH but are not used by the PSFCH may be used by the PSFCCH for the coordination message. Even though the frequency resources are shown as reserved or used in units of sub-channels, the frequency resources may also be reserved or used in other units such as resource blocks (RB) or physical resource blocks (PRB).

FIG. 7B and FIG. 7C show that part of the unused frequency resources for the PSFCH may be used for the PSFCCH. FIG. 7B shows that the sub-channel containing the frequency resources for the PSFCCH may be concatenated with the sub-channels containing the frequency resources for the PSFCH. FIG. 7C shows that the sub-channel containing the frequency resources for the PSFCCH may be non-concatenated with the sub-channels containing the frequency resources for the PSFCH. The frequency resources for the PSFCCH may be at one side of the resource pool, while the frequency resources for the PSFCH may be at the other side of the resource pool.

FIG. 7D shows that the frequency resources of the PSFCCH may be unused frequency resources of a frequency pool not reserved for the PFSCH. The frequency resources of the PSFCCH may include frequency resources outside of the last symbols of a slot reserved for the PSFCH. The frequency resources reserved but are unused by the PSFCH are not used by the PSFCCH.

When all or part of the unused frequency resources of the PSFCH are used for the PSFCCH, bitmaps may be used to indicate the allocation of frequency resources between the PSFCCH and for the PSFCH. In one aspect, there may be a joint resource block (RB) level bitmap used to allocate the PSFCH resources and PSFCCH resources. The amount of allocated PSFCH resources (e.g., A RBs) may be additionally indicated while the remaining resources are for the PSFCCH. In one aspect, the amount of allocated PSFCH resources may be defined by resource pool configuration. For example, when the joint bitmap=[1, 1, 0, 1, 1, . . . , 0, 1, 1], the length of the bitmap may equal to the number of RBs in a resource pool. The RBs corresponding to the first A 1's in the joint bitmap may indicate the resources from the resource pool allocated for the PSFCH and the RBs corresponding to the remaining 1's in the joint bitmap may indicate the resources from the resource pool allocated for the PSFCCH.

In one aspect, there may be separate RB level bitmaps for allocating the PSFCH and the PSFCCH resources. For example, in a first bitmap of [1, 0, 1, 0, . . . , 0, 0] with the length of the bitmap equal to the number of RBs in a resource pool, the RBs corresponding to 1's in the first bitmap are for PSFCH resources. In a second bitmap of [0, 1, 0, 1, . . . , 1, 0] with the length of the bitmap also equal to the number of RBs in a resource pool, the RBs corresponding the 1's in the second bitmap are for the PSFCCH resources. The positions of 1's in the first bitmap do not overlap the positions of 1's in the second bitmap.

In one aspect, there may be a correlated RB level bitmap for the PSFCH and PSFCCH resources. The same bitmap may be used to indicate the PSFCH and PSFCCH resources, but with different offsets (e.g., starting RB positions) for the PSFCH and the PSFCCH resources. For example, a bitmap of [1, 0, 1, 0, . . . , 0, 0] with the length equal to the first N RBs in a resource pool, the positions of 1's may indicate the resources from the resource pool allocated for the PSFCH. The same bitmap may be used to indicate the resources in a second N RBs of the resource pool allocated for the PSFCCH, wherein the second N RBs are offset from the first RBs.

The PSSCH carrying the reserved resources received from the transmitting UE may be mapped to the resources of the PSFCCH configured to carry the corresponding coordination message. Such resource mapping for the coordination message may be linked to the mapping from the PSSCH carrying the reserved resources to the PSFCH configured to carry the corresponding HARQ feedback.

Figure 8B:
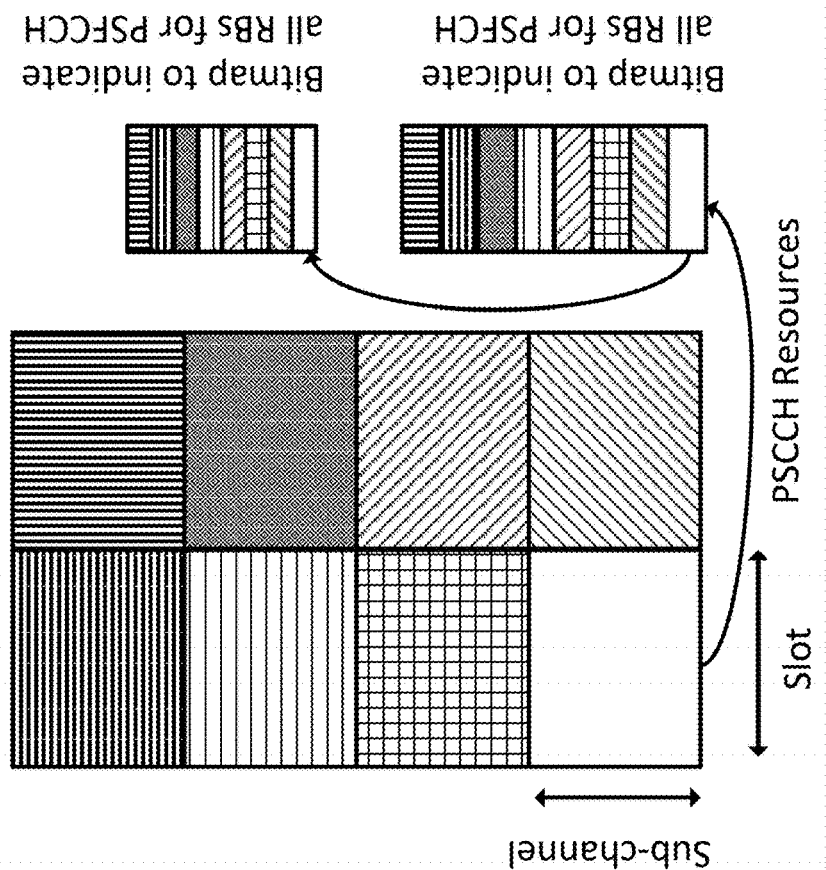
FIG. 8A and FIG. 8B depict frequency resource mappings from PSSCH to PSFCCH and from PSSCH to PSFCH according to one aspect of the disclosure.
Figure 8A:
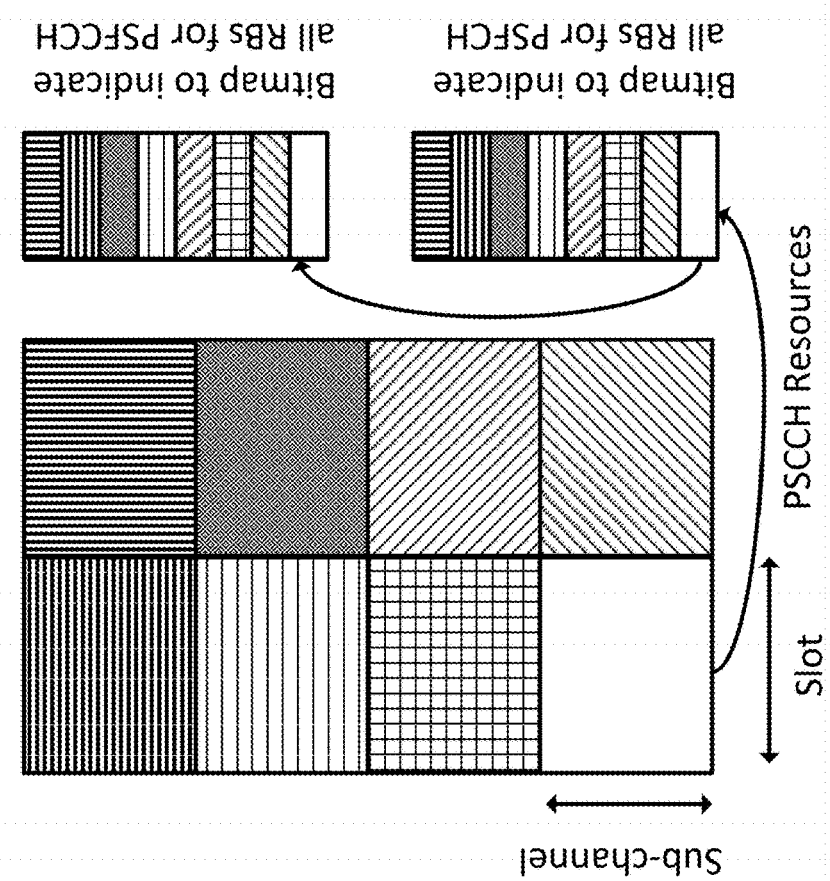

FIG. 8A and FIG. 8B depict frequency resource mappings from PSSCH to PSFCCH and from PSSCH to PSFCH according to one aspect of the disclosure. There may be a linkage between the PSFCH frequency resources and the PSFCCH frequency resources during the mapping from the PSSCH to PSFCCH and from the PSSCH to PSFCH. In one aspect, the receiving UE may determine the amount of frequency resources configured for the PSFCH and for the PSFCCH. If the amount of frequency resources for the PSFCCH is equal to the amount of frequency resources for PSFCH, there may be a one-to-one correspondence between mapping the PSSCH carrying the resources to the configured frequency resources of the PSFCCH carrying the corresponding coordination message and mapping the PSSCH to the configured frequency resources of the PSFCH carrying the corresponding HARQ feedback.

FIG. 8A shows a one-to-one mapping between PSFCH frequency resources and PSFCCH frequency resources. For example, if the receiving UE's PSFCH frequency resource corresponds to the i-th one in a first bitmap, then the receiving UE's PSFCCH frequency resource corresponds to the i-th one in the second bitmap. The PSSCH from the first sub-channel of the first slot may be mapped to the first N1

RB of the PSFCH frequency resources for carrying the HARQ feedback and to the first N1 RB of the PSFCCH frequency resources for carrying the coordination message. Similarly, the PSSCH from the first sub-channel of second slot may be mapped to the second N1 RB of the PSFCH frequency resources for carrying the HARQ feedback and to the second N1 RB of the PSFCCH frequency resources for carrying the coordination message. This one-to-one mapping may be repeated for the PSSCH from the subsequent sub-channels of the first and second slots.

If the amount of frequency resources for PSFCCH is not equal to the amount of frequency resources for PSFCH, there may be a "set-to-set" correspondence between mapping the PSSCH to the configured frequency resources of the PSFCCH carrying the corresponding coordination message and mapping the PSSCH to the configured frequency resources of the PSFCH carrying the corresponding HARQ feedback. FIG. 8B shows a "set-to-set" mapping between PSFCH frequency resources and PSFCCH frequency resources. For example, if the receiving UE's PSFCH frequency resources correspond to [i1, i1+k1] ones in a first bitmap, then the receiving UE's PSFCCH frequency resources correspond to [i2, i2+k2] ones in a second bitmap. The PSSCH from the first sub-channel of the first slot may be mapped to the first N1 RB of the PSFCH frequency resources for carrying the HARQ feedback and to the first N2 RB of the PSFCCH frequency resources for carrying the coordination message. Similarly, the PSSCH from the first sub-channel of second slot may be mapped to the second N1 RB of the PSFCH frequency resources for carrying the HARQ feedback and to the second N2 RB of the PSFCCH frequency resources for carrying the coordination message. This set-to-set mapping may be repeated for the PSSCH from the subsequent sub-channels of the first and second slots. The set-to-set mapping may be determined by a ratio of the amount of frequency resources configured for the PSFCH and the PSFCCH. For example, in the above example, the ratio of N1 to N2 may be equal to the ratio of the number of frequency resources configured for the PSFCH and PSFCCH (e.g., ratio of k1 to k2).

The resources reserved by the transmitting UE may include reserved resources for one or more transmission slots. Reserved resources in a subsequent transmission slot may be used to retransmit sidelink data that fails to be received in an earlier transmission slot or to transmit new sidelink data. Reserved resources may be periodic or aperiodic. The coordination message may indicate whether the reserved resources are feasible or not feasible based on local sensing by the receiving UE. The reserved resource may be non-feasible if they collide with resources reserved by another transmitting UE with higher priority or by the receiving UE itself. The reserved resource may also be non-feasible if the receiving UE has sidelink or uplink transmissions scheduled on the same slot and half duplex restriction prevents the simultaneous transmission and reception, while the receiving UE's sidelink or uplink transmissions are associated with a higher data priority.

In one aspect, the content of the coordination message may include a single bit with a positive or negative state to indicate whether the reserved resources from the transmitting UE are feasible or non-feasible based on the receiving UE's local sensing. For example, one state (e.g., '0') may indicate that the reserved resources are not feasible. This may occur when the transmitting UE's reserved resources have collisions with a second transmitting UE's reserved resources and the difference in the reference signal received power (RSRP) from the two transmitting UEs is below a configured threshold. The threshold may be configured to ensure that the receiving UE's sidelink protection does not create a very large protection zone. In one aspect, the threshold may be configured when the resource pool is configured, per a unicast or groupcast session, or as indicated by the Sidelink Control Information (SCI). In one aspect, the threshold may depend on data priority.

In one aspect, when there are multiple reserved resources such as reserved resources for multiple transmission slots, collisions on any reserved resources may cause the coordination message to indicate that the reserved resources are non-feasible. In one aspect, only collisions on the next reserved resource may cause the coordination message to indicate that the reserved resources are non-feasible. For example, if two or more resources are reserved by the transmitting UE, then only collisions in the first reversed resource may generate the non-feasibility state regardless of collisions in remaining resources. In one aspect, when the transmitting UE's reserved resources have collisions with the receiving UE's own resource reservation or selection, the receiving UE's own data transmission has a higher priority and the coordination message may indicate that the reserved resources are not feasible.

In one aspect, when the coordination messages are transmitted on the PSFCCH, the coordination message may be encoded in the code domain to map the coordination message to cyclic shifts of a sequence. For example, the single bit of the coordination message indicating the feasibility or non-feasibility state may be mapped to the sequence cyclic shift parameter $m_{cs}$ based on the PUCCH format 0. The cyclically shifted sequence may be carried using the configured time and frequency resources of the PSFCCH.

Figure 9:
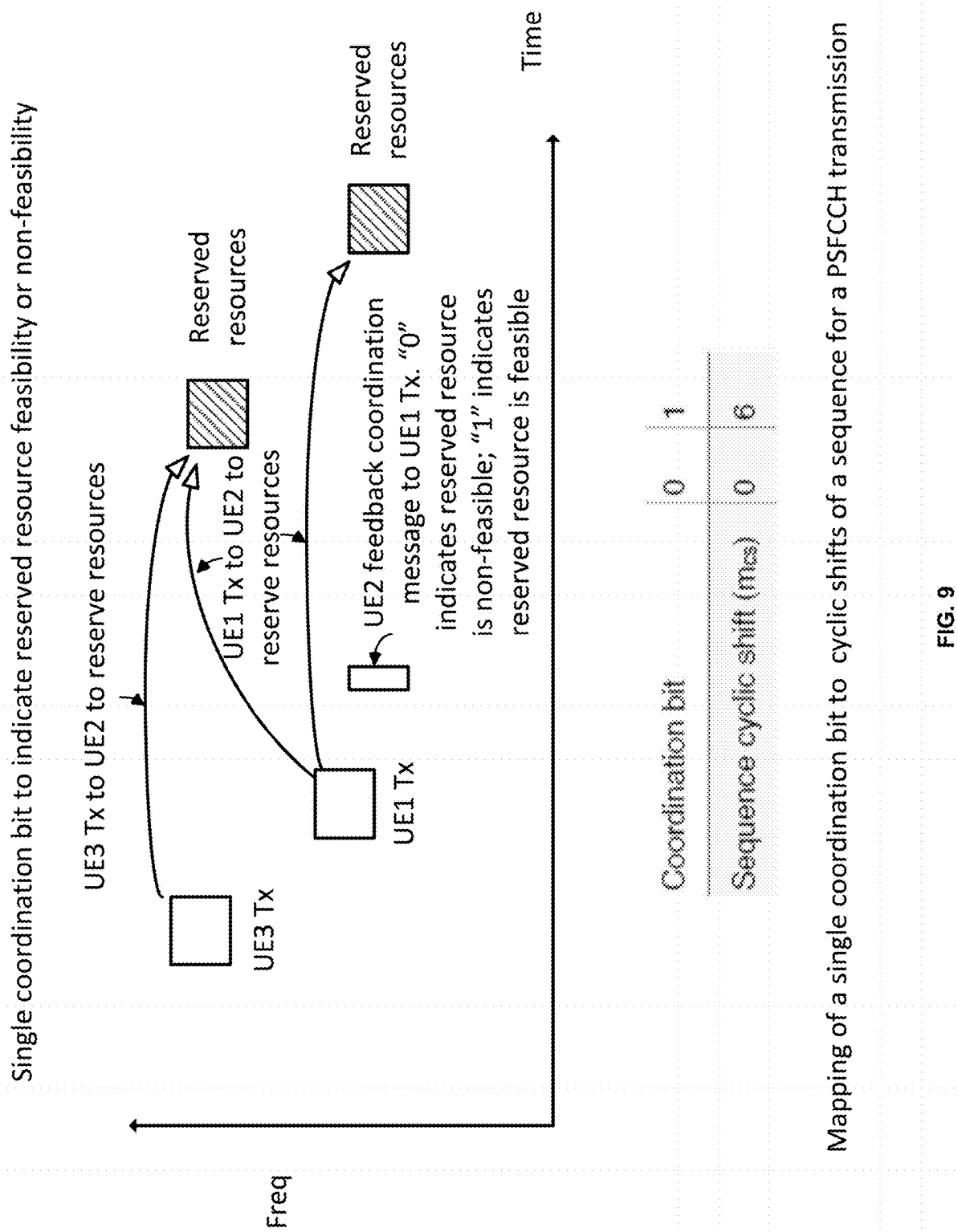
FIG. 9 depicts the coordination message containing a single bit to indicate feasibility or non-feasibility of the reserved resources and mapping of the single bit to cyclic shifts of a sequence for a PSFCCH transmission according to one aspect of the disclosure.

FIG. 9 depicts the coordination message containing a single bit to indicate feasibility or non-feasibility of the reserved resources and mapping of the single bit to cyclic shifts of a sequence for a PSFCCH transmission according to one aspect of the disclosure. A '0' state in the coordination message bit may indicate that the reserved resources are not feasible and a '1' state may indicate that the reserved resources are feasible. The coordination message may indicate the '1' state when the reserved resources from the transmitting UE do not collide with resources reserved by another transmitting UE or do not collide with resources reserved or selected by the receiving UE. In one aspect, the coordination message may indicate the '1' state even when the reserved resources from the transmitting UE collide with resources reserved by another transmitting UE if the difference in the RSRP from the two transmitting UEs is above the configured threshold.

A second transmitting UE labeled UE3 may reserve resources for sidelink communication with the receiving UE labeled UE2. The transmitting UE labeled UE1 tries to reserve the resources for two transmission slots for its sidelink communication with the receiving UE. When the reserved resources of the first transmission slot from UE1 collide with the resources reserved by UE3 and if the difference in the RSRP from UE1 and UE3 is below a configured threshold, the receiving UE may generate a state of '0' for the single bit of the coordination message to indicate that the reserved resources from the UE1 are not feasible. The receiving UE may transmit the coordination message to UE1 to prompt UE1 to reselect the reserved resources to avoid collisions. FIG. 9 also shows that when the single bit of the coordination message is at the '0' state, it is mapped to a cyclic shift of 0 for the parameter $m_{cs}$. Otherwise, when the single bit of the coordination message is at the '1' state to indicate the reserved resources are feasible, it is mapped to a cyclic shift of 6 for the parameter $m_{cs}$.

In one aspect, a single bit of the coordination message may indicate only non-feasibility of the reserved resources. That is, one state such as the '0' state is indicated only when the reserved resources from the transmitting UE are not feasible. If the reserved sources from the transmitting UE are feasible, the receiving UE does not send the coordination message. This may be used for either unicast or groupcast.

Figure 10:
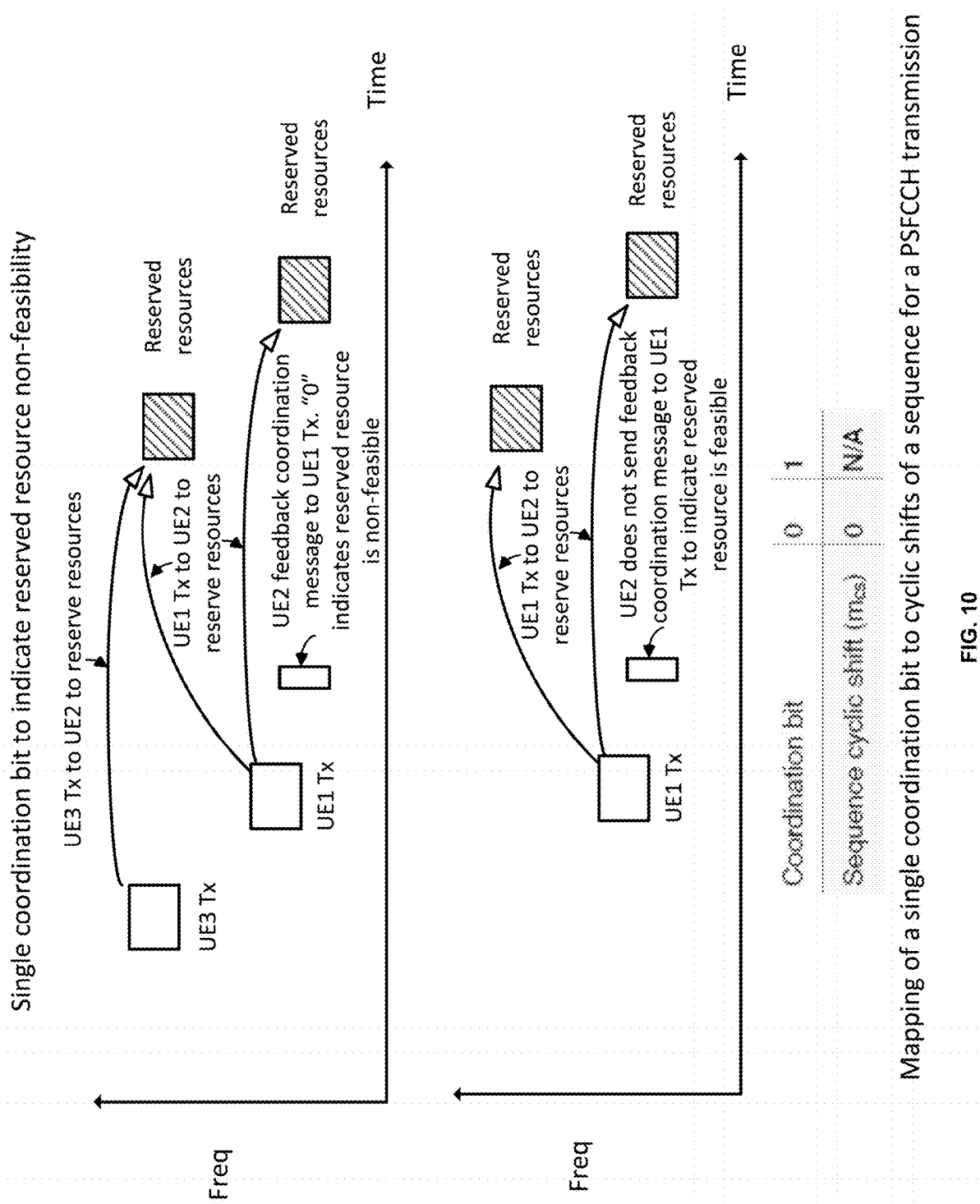
FIG. 10 depicts the coordination message containing a single bit to indicate non-feasibility of the reserved resources and mapping of the single bit to cyclic shifts of a sequence for a PSFCCH transmission according to one aspect of the disclosure.

FIG. 10 depicts the coordination message containing a single bit to indicate non-feasibility of the reserved resources and mapping of the single bit to cyclic shifts of a sequence for a PSFCCH transmission according to one aspect of the disclosure. A '0' state in the coordination message bit may indicate that the reserved resources are not feasible. When UE1 tries to reserve the resources for two transmission slots for its sidelink communication with the receiving UE, the reserved resources of the first transmission slot from UE1 collide with the resources reserved by UE3 and if the difference of the RSRP from UE1 and UE3 is below a configured threshold, the receiving UE may generate a state of '0' for the single bit of the coordination message to indicate that the reserved resources from the UE1 are not feasible. If the reserved resource from the UE1 are feasible, the receiving UE does not send the coordination message with a state of '1' to UE1 to indicate that the reserved resources are feasible. FIG. 10 also shows that when the single bit of the coordination message is at the '0' state, it is mapped to a cyclic shift of 0 for the parameter $m_{cs}$ for transmission on the configured resources of the PSFCCH. When the reserved resources are feasible, it is not mapped to a cyclic shift because the coordination message is not transmitted. The mapping of the coordination bit to the cyclic shift of the sequence may reuse PUCCH format 0.

In one aspect, the coordination message may include multiple bits of information. The number of bits may be equal to the number of reserved resources from the transmitting UE such that each bit corresponds to a reserved resource. For example, when the transmitting UE reserves two resources, if the receiving UE detects that the first reserved resource is not feasible but the second reserved resource is feasible, then the two bits of the coordination message may be '01.' In one aspect, additional bits may indicate the interference level at the resources reserved by the transmitting UE when the reserved resources are determined to be not feasible. In one aspect, the interference level may indicate the RSRP from the second transmitting UE. For example, the first bit may indicate there is some interference at the reserved resource and the remaining bits may indicate the interference level. In another example, one code point may indicate no interference, and other code points may indicate the interference with difference levels. In one aspect, additional bits may indicate that the resources in the subsequent transmission slots have collisions in the subsequent periods if the resource reservation is periodic. For example, one bit may indicate the non-feasibility of the reserved resources in the first transmission slot and one additional bit may indicate the non-feasibility of any of the reserved resources in the subsequent transmission slots. Combinations of various aspects of the coordination message may be used. In one aspect, the content of the coordination message may be configured when the resource pool is configured, per a unicast or groupcast session, or as indicated by the SCI.

Figure 11:
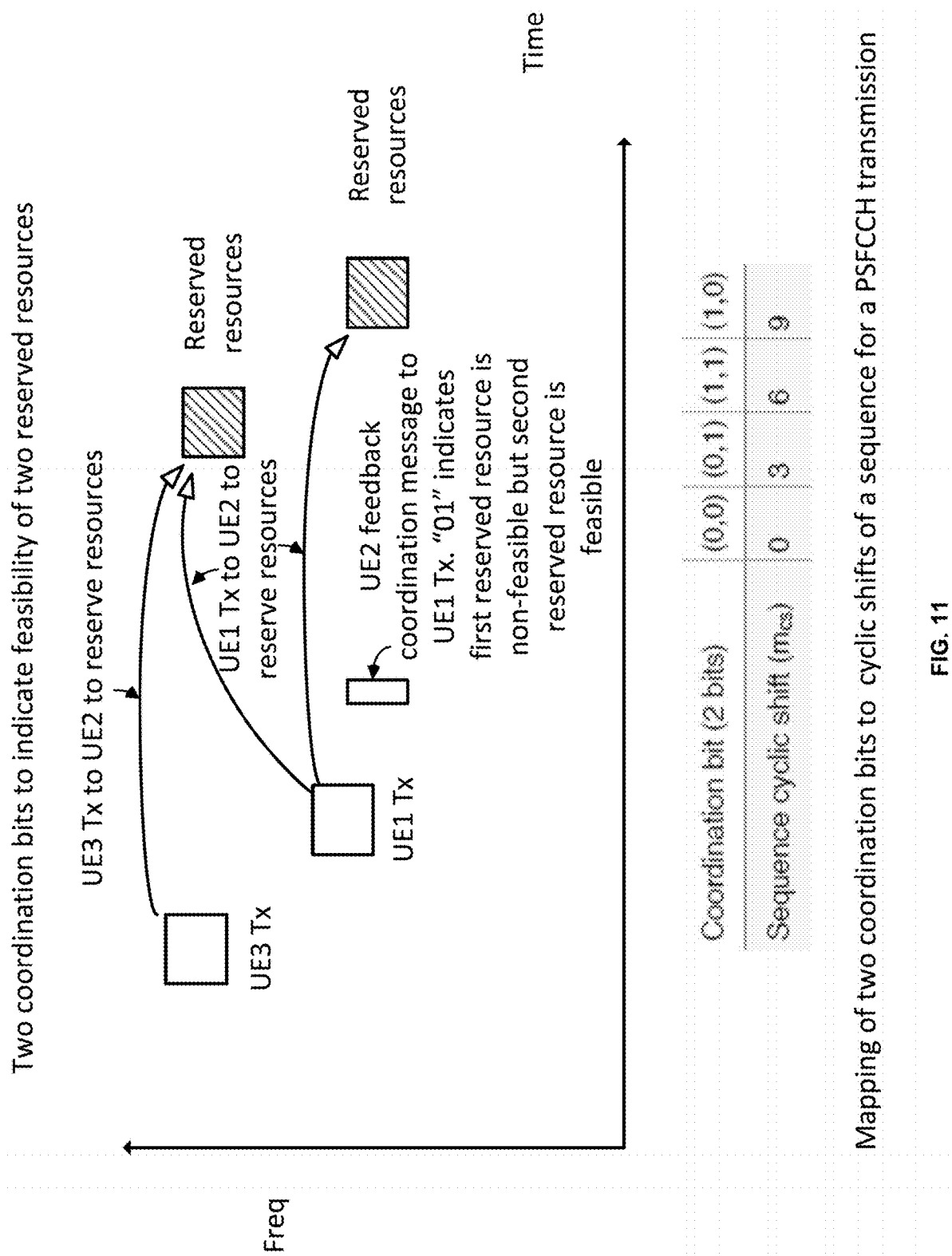
FIG. 11 depicts the coordination message containing two bits to indicate feasibility or non-feasibility of two reserved resources and mapping of the two bits to cyclic shifts of a sequence for a PSFCCH transmission according to one aspect of the disclosure.

FIG. 11 depicts the coordination message containing two bits to indicate feasibility or non-feasibility of two reserved resources and mapping of the two bits to cyclic shifts of a sequence for a PSFCCH transmission according to one aspect of the disclosure. When UET tries to reserve the resources for two transmission slots for its sidelink communication with the receiving UE, the reserved resources of the first transmission slot from UET collide with the resources reserved by UE3 but the reserved resources of the second transmission slot do not collide with other reserved resources. If the difference of the RSRP from UET and UE3 is below a configured threshold, the receiving UE may generate a state of '01' for the two bits of the coordination message to indicate that only the first reserved resources of the first transmission slot from the UET are not feasible. FIG. 11 also shows that when the two bits of the coordination message are at the '00' '01' '10' and '11' states, they are mapped to cyclic shifts of 0, 3, 6, and 9 for the parameter mes, respectively. The mapping of the coordination bits to the cyclic shift of the sequence may reuse PUCCH format 2 or PUCCH format 0.

In one aspect, when the resources of the PSFCH are jointly used for the HARQ feedback and the coordination message, the HARQ feedback and the coordination message may be jointly encoded in the code domain. For example, in unicast or groupcast HARQ option 2, where the ACK or NACK is fed back, the configured maximum number of cyclic shift pairs may be 3. The possible values may be {1, 2, 3}. The configured values for the initial cyclic shift parameter mo values may be {0, 1, 2}. There may be 4 possible value combinations of the HARQ bit and the single-bit coordination message mapped to the sequence cyclic shift parameter mes. The cyclically shifted sequence may be carried using the configured time and frequency resources of the PSFCH. In one aspect, the receiving UE may negotiate with the transmitting UE to use the joint encoding of the HARQ feedback and the coordination message.

In another example of the joint encoding of the HARQ bit of unicast or groupcast HARQ option 2 and the single-bit coordination message, the configured maximum number of cyclic shift pairs may be 4. The possible values may be {1, 2, 3, 4}. The configured values for the initial cyclic shift parameter mo values may be {0, 1, 2, 3}. There may be 3 possible value combinations of the HARQ bit and the single-bit coordination message mapped to the sequence cyclic shift parameter mes. If the HARQ feedback is ACK, there may be no need to indicate positive or negative interference level via the coordination message.

In one aspect, the joint encoding may be extended to support multiple bits of the coordination message. For example, the HARQ bit of the unicast or groupcast HARQ option 2 may be jointly encoded with 2-bits of the coordination message. There may be 5 possible value combinations of the bit triples mapped to the sequence cyclic shift parameter $m_{cs}$. Again, if the HARQ feedback is ACK, there may be no need to indicate positive or negative interference level via the coordination message.

FIG. 12A to FIG. 12C depict various joint encoding of the HARQ NACK/ACK bit and one or more bits of the coordination message to map to cyclic shifts of a sequence for a PSFCH transmission according to one aspect of the disclosure. FIG. 12A shows the joint encoding of the HARQ bit of unicast or groupcast HARQ option 2 and a single-bit coordination message. When the value combinations of the NACK/ACK bit and the coordination bit are at the '00' '01' '10' and '11' states, they are mapped to cyclic shifts of 0, 3, 6, and 9 for the parameter $m_{cs}$, respectively.

FIG. 12B shows another joint encoding of the HARQ bit of unicast or groupcast HARQ option 2 and the single-bit coordination message. When the value combinations of the NACK bit and the coordination bit are at the '00' '01' and 'lx' states, they are mapped to cyclic shifts of 0, 4, and 8 for the parameter $m_{cs}$, respectively. When the sidelink HARQ is ACK, there is no need to indicate the coordination bit.

FIG. 12C shows the joint encoding of the HARQ bit of unicast or groupcast HARQ option 2 and a two-bit coordination message. When the value combinations of the NACK bit and the two coordination bits are at the '000' '001' '010', '011' and 'lxx' states, they are mapped to cyclic shifts of 0, 2, 4, 6, and 8 for the parameter mes, respectively. When the sidelink HARQ is ACK, there is no need to indicate the coordination bit.

In one aspect, in joint encoding of a single-bit coordination message with the HARQ bit of unicast or groupcast option 1, where only the NACK is fed back, the configured maximum number of cyclic shift pairs may be 6. The possible values may be {1, 2, 3, 6}. The configured values for the cyclic shift parameter mo values may be {0, 1, 2, 3, 4, 5}. There may be 2 possible value combinations of the HARQ-NACK bit and the coordination message bit mapped to the sequence cyclic shift parameter $m_{cs}$. The message bit may indicate positive or negative interference only if HARQ is NACK. If HARQ is ACK, there is no need to indicate positive or negative interference level via the coordination message. The cyclically shifted sequence may be carried using the configured time and frequency resources of the PSFCH.

FIG. 13 depicts a joint encoding of the HARQ NACK bit and one bit of the coordination message to map to cyclic shifts of a sequence for a PSFCH transmission according to one aspect of the disclosure. When the value combinations of the NACK bit and the coordination bit are at the '00' and '01' states, they are mapped to cyclic shifts of 0 and 6 for the parameter $m_{cs}$, respectively. The coordination message is indicated only if the HARQ is NACK. When the HARQ is ACK, there is no feedback of the HARQ bit and no feedback of the coordination message.

Figure 14:
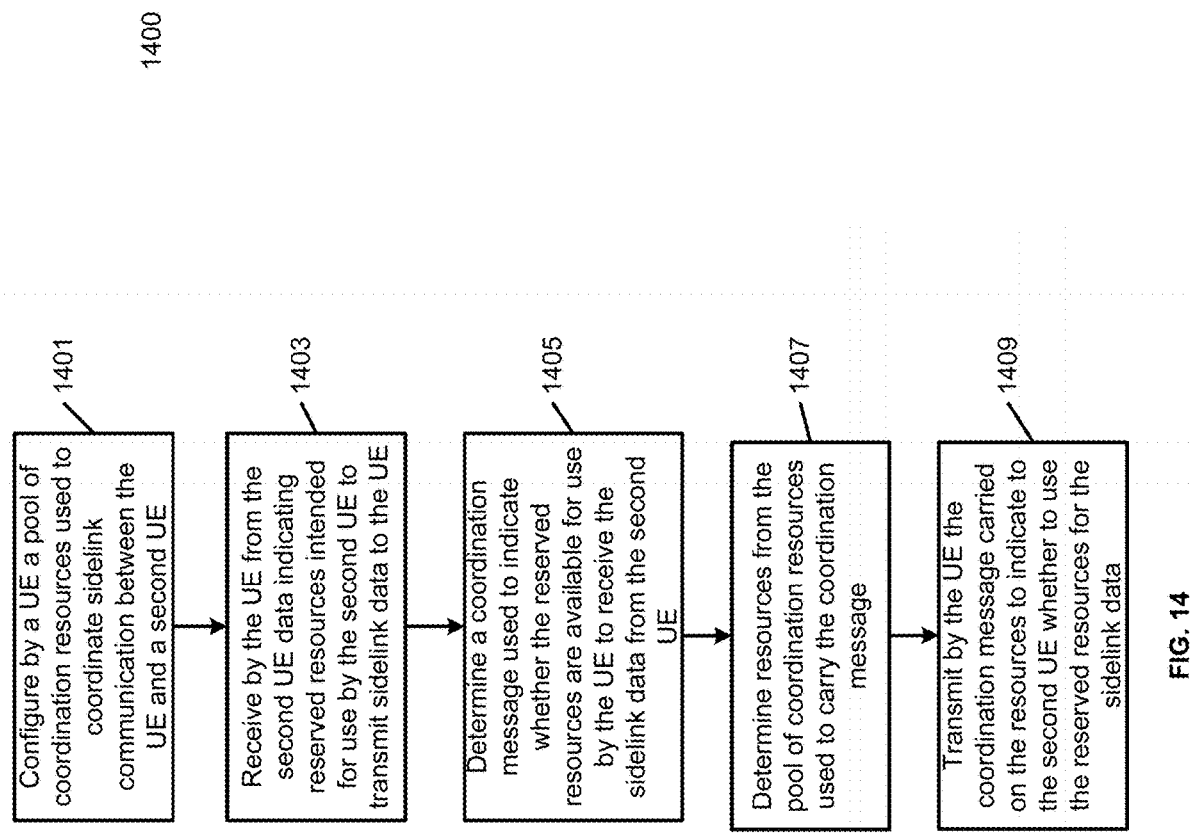
FIG. 14 is a flow diagram of a process to allocate sidelink coordination resources and encode coordination message at the receiving UE according to one aspect of the disclosure.

FIG. 14 is a flow diagram of a method 1000 to allocate sidelink coordination resources and encode coordination message at the receiving UE, according to some embodiments.

In operation 1401, a UE configures a pool of coordination resources used to coordinate sidelink communication between the UE and a second UE.

In operation 1403, the UE receives from the second UE data indicating reserved resources intended for use by the second UE to transmit sidelink data to the UE.

In operation 1405, the UE determines a coordination message used to indicate whether the reserved resources are available for use by the UE to receive the sidelink data from the second UE.

In operation 1407, the UE determines resources from the pool of coordination resources used to carry the coordination message.

In operation 1409, the UE transmits the coordination message carried on the resources to indicate to the second UE whether to use the reserved resources for the sidelink data.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method of communication by a wireless user equipment (UE) with a second UE in a communication network, the method comprising:
   configuring, by the UE, a pool of coordination resources for sending a coordination message that is associated with sidelink communication between the UE and the second UE, including allocating, with a first bitmap, resources including first physical resource blocks (PRBs) to a Physical Sidelink Feedback Channel (PSFCH) for carrying Hybrid Automatic Repeat Request (HARQ) feedback of the sidelink communication; and allocating, with a second bitmap, resources including second PRBs to a Physical Sidelink Feedback Coordination Channel (PSFCCH) for separately carrying the coordination message;
   receiving, by the UE from the second UE, data indicating reserved resources intended for use by the second UE to transmit sidelink data to the UE;
   determining the coordination message used to indicate whether the reserved resources are available for use by the UE to receive the sidelink data from the second UE;
   determining resources from the pool of coordination resources used to carry the coordination message; and
   transmitting, by the UE, the coordination message carried on the resources to indicate to the second UE whether to use the reserved resources for the sidelink data.

2. The method of claim 1, wherein configuring the pool of coordination resources used to coordinate the sidelink communication comprises:
   configuring the pool of coordination resources when the sidelink communication comprises sidelink unicast or sidelink groupcast from the second UE to the UE.

3. The method of claim 1, wherein configuring the pool of coordination resources used to coordinate the sidelink communication comprises:
   configuring resources from a Physical Sidelink Feedback Channel (PSFCH) jointly for carrying Hybrid Automatic Repeat Request (HARQ) feedback of the sidelink communication and the coordination message.

4. The method of claim 1, wherein the resources of the PSFCCH comprises a subset of frequency resources that are not used by the PSFCH in a plurality of symbols at an end of a slot, and wherein the frequency resources of the PSFCCH are concatenated with the frequency resources of the PSFCH.

5. A baseband processor of a wireless user equipment (UE) configured to perform operations comprising:
   configure a pool of coordination resources for sending a coordination message that is associated with sidelink communication between the UE and a second UE, including allocating, with a first bitmap, resources including first physical resource blocks (PRBs) to a Physical Sidelink Feedback Channel (PSFCH) for carrying Hybrid Automatic Repeat Request (HARQ) feedback of the sidelink communication; and allocating, with a second bitmap, resources including second PRBs to a Physical Sidelink Feedback Coordination Channel (PSFCCH) for separately carrying the coordination message;
   receive from the second UE data indicating reserved resources intended for use by the second UE to transmit sidelink data to the UE;
   determine the coordination message used to indicate whether the reserved resources are available for use by the UE to receive the sidelink data from the second UE;
   determine resources from the pool of coordination resources used to carry the coordination message; and
   transmit the coordination message carried on the resources to indicate to the second UE whether to use the reserved resources for the sidelink data.

6. The baseband processor of claim 5, wherein the operations to configure the pool of coordination resources used to coordinate the sidelink communication comprises operations to:
   configure the pool of coordination resources when the sidelink communication comprises sidelink unicast or sidelink groupcast from the second UE to the UE.

7. The baseband processor of claim 5, wherein the resources of the PSFCH and the resources of the PSFCCH comprise a plurality of symbols at an end of a slot.

8. The baseband processor of claim 7, wherein the resources of the PSFCCH comprise all of frequency resources not used by the PSFCH in the plurality of symbols at the end of the slot.

9. The baseband processor of claim 7, wherein the resources of the PSFCCH comprises a subset of frequency resources that are not used by the PSFCH in the plurality of symbols at the end of the slot, and wherein the frequency resources of the PSFCCH are concatenated with the frequency resources of the PSFCH.

10. The baseband processor of claim 7, wherein the resources of the PSFCCH comprises a subset of frequency resources that are not used by the PSFCH in the plurality of symbols at the end of the slot, and wherein the frequency resources of the PSFCCH are non-concatenated with the frequency resources of the PSFCH.

11. The baseband processor of claim 5, wherein the operations to determine the resources from the pool of coordination resources used to carry the coordination message comprises operations to:
   determine a first plurality of frequency resources for the PSFCH and a second plurality of frequency resources for the PSFCCH from the pool of coordination resources; and
   determine a joint bitmap comprising the first bitmap and the second bitmap, whose length corresponds to a total number of frequency resources in the pool of coordination resources, wherein a first subset of asserted bits in the joint bitmap indicate the first plurality of frequency resources used to carry the HARQ feedback on the PSFCH and a second subset of asserted bits in the joint bitmap indicate the second plurality of frequency resources used to carry the coordination message on the PSFCCH.

12. The baseband processor of claim 5, wherein the operations to determine the resources from the pool of coordination resources used to carry the coordination message comprises operations to:
   determine a first plurality of frequency resources for the PSFCH and a second plurality of frequency resources for the PSFCCH from the pool of coordination resources;
   determine the first bitmap whose length corresponds to a total number of frequency resources in the pool of coordination resources, wherein a first subset of asserted bits in the first bitmap indicate the first plurality of frequency resources used to carry the HARQ feedback on the PSFCH; and
   determine the second bitmap whose length corresponds to a total number of frequency resources in the pool of coordination resources, wherein a second subset of asserted bits in the second bitmap indicate the second plurality of frequency resources used to carry the coordination message on the PSFCCH.

13. The baseband processor of claim 5, wherein the operations to determine the resources from the pool of coordination resources used to carry the coordination message comprises operations to:
   determine a first plurality of frequency resources for the PSFCH and a second plurality of frequency resources for the PSFCCH from the pool of coordination resources; and
   determine a correlated bitmap comprising the first bitmap and the second bitmap whose bits correspond to the first plurality of frequency resources or the second plurality of frequency resources, wherein asserted bits in the correlated bitmap indicate both the first plurality of frequency resources used to carry the HARQ feedback on the PSFCH and the second plurality of frequency resources used to carry the coordination message on the PSFCCH, wherein the second plurality of frequency resources are offset from corresponding frequency resources of the first plurality of frequency resources.

14. The baseband processor of claim 5, wherein the operations to determine the coordination message comprises operations to:
   determine that one or more of the reserved resources are unavailable for use by the UE to receive the sidelink data from the second UE due to a collision with resources reserved by a third UE, wherein an estimated difference of a received power level from the second UE and a received power level from the third UE is below a threshold.

15. The baseband processor of claim 5, wherein the operations to determine the coordination message comprises operations to:
   determine that one or more of the reserved resources are unavailable for use by the UE to receive the sidelink data from the second UE due to a collision with resources reserved by the UE for data transmission.

16. The baseband processor of claim 5, wherein the data received from the second UE indicate a plurality of reserved resources intended for use by the second UE to transmit sidelink data to the UE, and wherein the operations to determine the coordination message comprises operations to:
   determine one or more bits of the coordination message, wherein each bit of the coordination message indicates whether a corresponding one of the plurality of reserved resources is available for use by the UE to receive the sidelink data.

17. The baseband processor of claim 5, wherein the operations to determine the coordination message comprises operations to:
   determine a joint encoding of the coordination message and the HARQ feedback, wherein the HARQ feedback includes an acknowledgement (ACK) signal signaling that the data received from the second UE indicating the reserved resources is received correctly or a non-acknowledgement (NACK) signal indicating that the data received from the second UE is corrupted; and
   map the joint encoding to a cyclic shift of a sequence for transmission using the resources from the PSFCH.

18. A user equipment (UE) comprising:
   at least one antenna;
   at least one radio, wherein the at least one radio is configured to communicate with a second UE of a communication network using the at least one antenna; and
   at least one processor coupled to the at least one radio, wherein the at least one processor is configured to perform operations comprising:
   configure a pool of coordination resources for sending a coordination message that is associated with sidelink communication between the UE and a second UE, including allocating, with a first bitmap, resources including first physical resource blocks (PRBs) to a Physical Sidelink Feedback Channel (PSFCH) for carrying Hybrid Automatic Repeat Request (HARQ) feedback of the sidelink communication; and allocating, with a second bitmap, resources including second PRBs to a Physical Sidelink Feedback Coordination Channel (PSFCCH) for separately carrying the coordination message;
   receive from the second UE data indicating reserved resources intended for use by the second UE to transmit sidelink data to the UE;
   determine a coordination message used to indicate whether the reserved resources are available for use by the UE to receive the sidelink data from the second UE;
   determine resources from the pool of coordination resources used to carry the coordination message; and
   transmit the coordination message carried on the resources to indicate to the second UE whether to use the reserved resources for the sidelink data.

* * * * *